(12) United States Patent
Park

(10) Patent No.: US 11,449,285 B2
(45) Date of Patent: Sep. 20, 2022

(54) DOCUMENT SECURITY AND INTEGRITY VERIFICATION BASED ON BLOCKCHAIN IN IMAGE FORMING DEVICE

(71) Applicant: Hewlett-Packard Development Company, L.P., Spring, TX (US)

(72) Inventor: Sungjin Park, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/263,222

(22) PCT Filed: Jul. 12, 2019

(86) PCT No.: PCT/US2019/041607
§ 371 (c)(1),
(2) Date: Jan. 26, 2021

(87) PCT Pub. No.: WO2020/149879
PCT Pub. Date: Jul. 23, 2020

(65) Prior Publication Data
US 2021/0303236 A1    Sep. 30, 2021

(30) Foreign Application Priority Data

Jan. 16, 2019 (KR) .................... 10-2019-0005535

(51) Int. Cl.
*G06F 3/12* (2006.01)
*H04N 1/44* (2006.01)
(Continued)

(52) U.S. Cl.
CPC .......... *G06F 3/1222* (2013.01); *G06F 3/1238* (2013.01); *G06F 3/1286* (2013.01);
(Continued)

(58) Field of Classification Search
None
See application file for complete search history.

(56) References Cited

U.S. PATENT DOCUMENTS 9,862,222 B1    1/2018    Nagelberg et al.
9,935,772 B1    4/2018    Madisetti et al.
(Continued)

FOREIGN PATENT DOCUMENTS

JP       2018-516030 A      6/2018
WO    WO-2018/100227 A1   6/2018

*Primary Examiner* — Thomas D Lee
(74) *Attorney, Agent, or Firm* — Jefferson IP Law, LLP

(57) ABSTRACT

An image forming device and an operation method are provided. The method includes receiving a request for performing a preparation operation for verifying integrity of a first document according to a first image forming job for the first document, obtaining first transaction information indicating that the first image forming job has been performed for the first document and obtaining a first hash code corresponding to the first transaction information, registering the first transaction information and the first hash code in a ledger based on a network of a blockchain that distributes and manages a ledger in which transaction information of a certain document has been recorded, obtaining first verification information for verifying the integrity of the first document from the ledger according to the first image forming job, and verifying the integrity of the first document based on the first verification information.

13 Claims, 12 Drawing Sheets

(51) Int. Cl.
    *H04L 9/06*      (2006.01)
    *H04L 9/32*      (2006.01)

(52) U.S. Cl.
    CPC ............ *H04L 9/0643* (2013.01); *H04N 1/44* (2013.01); *H04N 2201/0094* (2013.01)

(56) References Cited

U.S. PATENT DOCUMENTS

| | | |
|---|---|---|
| 2017/0091397 A1 | 3/2017 | Shah |
| 2017/0329996 A1 | 11/2017 | Wilson |
| 2018/0257306 A1 | 9/2018 | Mattingly et al. |
| 2018/0302417 A1 | 10/2018 | Wilson |
| 2019/0268162 A1* | 8/2019 | Sahagun ............... H04L 9/3239 |

* cited by examiner

DOCUMENT SECURITY AND INTEGRITY VERIFICATION BASED ON BLOCKCHAIN IN IMAGE FORMING DEVICE

BACKGROUND

When important information or data in a certain document is forged, the content contained in the certain document may not be guaranteed. There are various technologies such as visible watermarks, invisible watermarks, barcodes, special ink, and the like that are used as security technologies for a document in order to prevent the printing of the document. In recent years, technologies for deciphering forgery and falsification through a storage of a digital image of an entire document have been developed.

BRIEF DESCRIPTION OF DRAWINGS

Examples of the disclosure will be more apparent from the following description taken in conjunction with the accompanying drawings, in which.

DETAILED DESCRIPTION OF EXAMPLES

Figure 1:
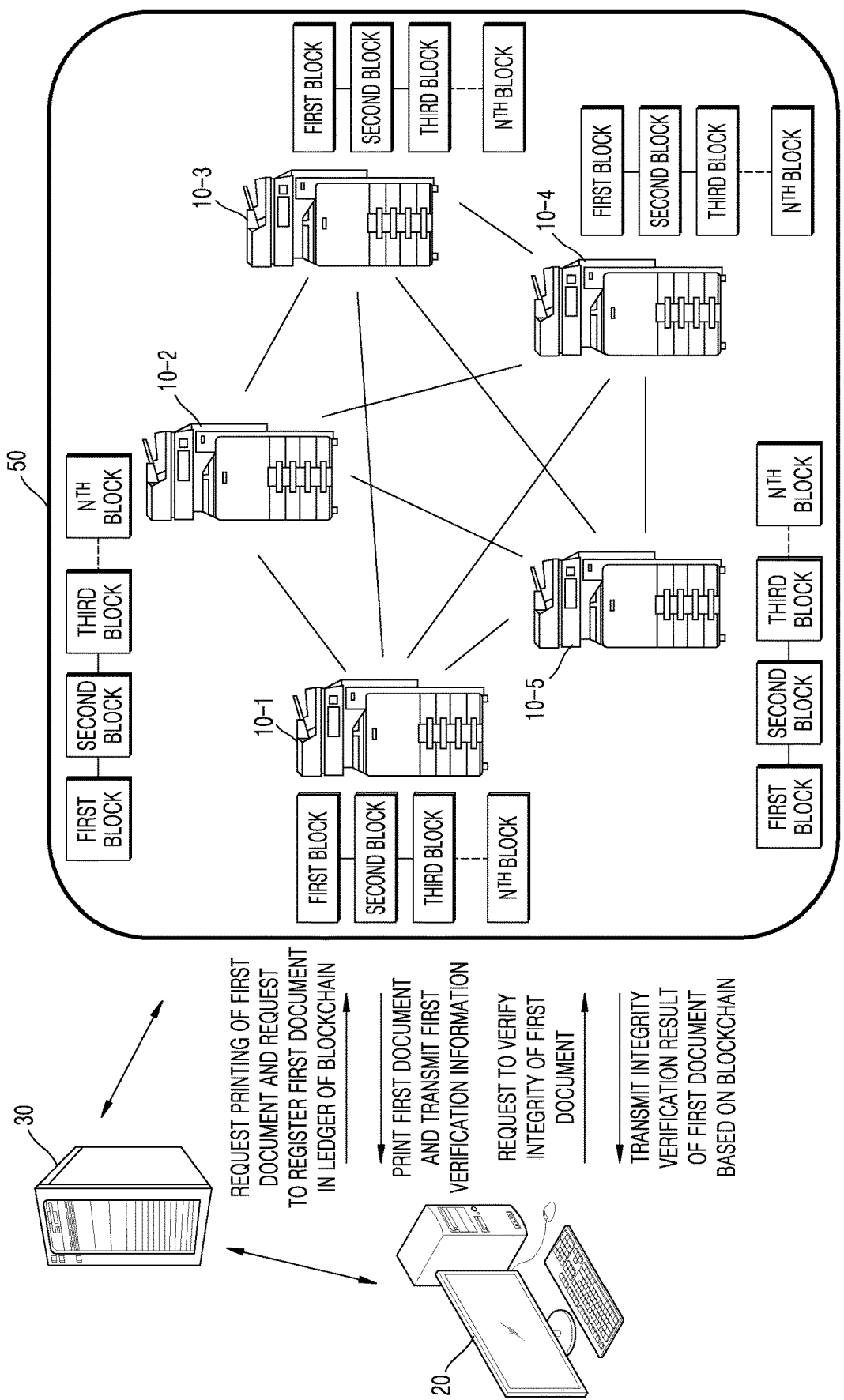
FIG. 1 is a conceptual diagram for describing an operation of an image forming device, based on a blockchain, for registering a certain document in a ledger and verifying integrity of the certain document, according to an example.

The term "image forming device" may refer to any device capable of performing an image forming job, such as a printer, a copier, a scanner, a fax machine, a multi-function printer (MFP), or a display device. The term "image forming job" may refer to printing, copying, scanning, or faxing.

The term "blockchain" refers to a distributed peer-to-peer (P2P) system of a ledger that utilizes software elements configured with an algorithm in which blocks are linked in an order to negotiate using encryption and security technologies of transaction information for a certain image forming job to ensure and maintain integrity. In addition, the term "blockchain" may refer to a distributed ledger technology in which a ledger that records transaction information is distributed to a P2P network instead of a central server of a specific organization, and nodes in the P2P network collectively record and manage the transaction information.

The term "node" may refer to a component in the network of the blockchain. For example, a node may be an image forming device, a network attached storage (NAS), a server, and the like.

The term "integrity" may refer to protection of certain information or certain data, and ensuring that the certain information or certain data is kept accurate and consistent. Also, the term integrity may refer to ensuring that there is no corruption or inconsistency in the certain information or in the certain data. Furthermore, the term integrity may refer to maintaining normal data so that unauthorized access does not corrupt inherent content of the data.

The term "transaction information" may refer to information related to a certain image forming job of a certain document for a certain user. For example, transaction information may include information that a first user has performed a certain image forming job on a first document, such as printing, copying, scanning, or faxing. The transaction information may also include information indicating metadata of the certain document, and the like. For example, the transaction information may include data on a creator ID, a document ID, a document title, a document size, a document creation time, and the like of the first document.

The term "hash function" may refer to a function of outputting input data of an arbitrary length as output data of a fixed length. Here, output data may include pseudo random numbers generated by the hash function. The hash function may be used to verify the integrity of data. The term "hash code" may refer to a value generated by the hash function. The hash code may also be referred to as a hash value. Furthermore, the hash value may be referred to as a hash code.

Below, a description will be given of examples of the present disclosure with reference to the attached drawings such that one with an ordinary skill in the art may easily perform examples. In this regard, the present disclosure may have different forms and should not be construed as being limited to the descriptions set forth herein.

FIG. 1 is a conceptual diagram for describing an operation of an image forming device, based on a blockchain, for registering a certain document in a ledger and verifying integrity of the certain document, according to an example.

Referring to FIG. 1, an electronic device 20 may request printing of a first document stored in the electronic device 20 to a first image forming device 10-1. The electronic device 20 may request the first image forming device 10-1 to register the first document in a ledger of a blockchain according to a user input. Here, the first image forming device 10-1 may manage transaction information of the certain document based on the blockchain. The first image forming device 10-1 may share the ledger with a plurality of nodes 10-2, 10-3, 10-4, and 10-5 in a network 50 of the blockchain. The first image forming device 10-1 may register the first document in the ledger of the blockchain. The first image forming device 10-1 may print the first document in response to the printing request of the first document and may transmit first verification information including a hash code used for verifying integrity of the first document to the electronic device 20. Examples of registering the certain document in the ledger of the blockchain will be described with reference to FIGS. 2 to 5.

The electronic device 20 may transmit the first document to a server 30 which manages an original document corresponding to the certain document. The server 30 may register the first document as the original document. When the server 30 receives a request for the original document for the certain document from the plurality of nodes 10-1, 10-2, 10-3, 10-4, and 10-5, the server 30 may transmit the certain document and information related to the certain document to the plurality of nodes 10-1, 10-2, 10-3, 10-4, and 10-5.

The electronic device 20 may request the first image forming device 10-1 to verify the integrity of the first document stored in the electronic device 20. The first image forming device 10-1 may receive an original document corresponding to the first document from the server 30 and verify the integrity of the first document. Further, the first image forming device 10-1 may compare a hash code of the first document with a hash code of a document corresponding to the first document in the ledger, based on the ledger of the blockchain. The first image forming device 10-1 may verify the integrity of the first document based on a result of the comparison. The first image forming device 10-1 may transmit the integrity verification result of the first document to the electronic device 20. Examples of verifying the integrity of a certain document will be described with reference to FIGS. 6 to 9.

Figure 2:
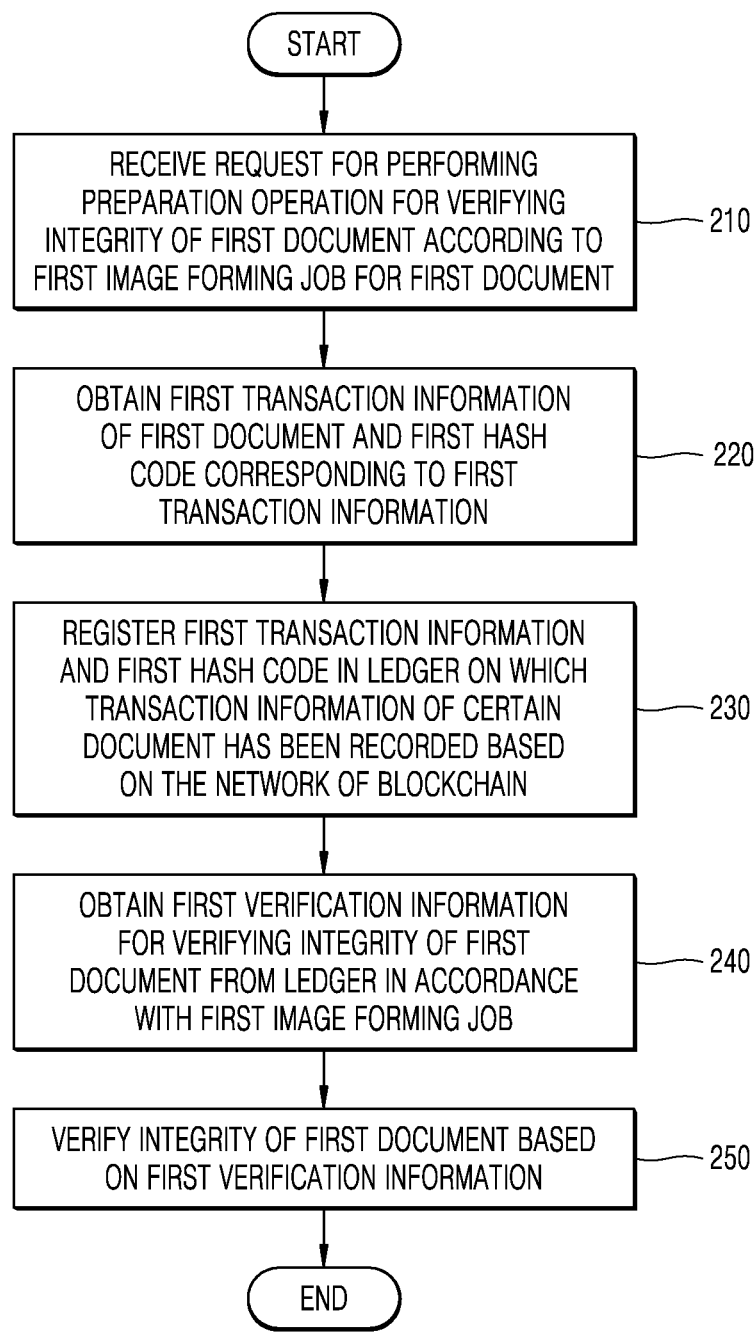
FIG. 2 is a flowchart of an operation method of an image forming device, according to an example.

FIG. 2 is a flowchart of an operation method of an image forming device, according to an example.

Referring to FIG. 2, an image forming device may receive a request for performing a preparation operation for verifying the integrity of a first document according to a first image forming job for the first document in operation 210. For example, the image forming device may receive the request for performing the preparation operation for verifying the integrity of the first document through an external button or a button displayed on a screen of a user interface device. For example, the image forming device may scan the first document and may receive a request for performing the preparation operation to be performed before the integrity verification of the scanned first document. The preparation operation may be an operation for registering the first document in a ledger of a blockchain. The preparation operation may be an operation according to operations 220 to 240 of the image forming device.

An electronic device may transmit the first document to a server which manages an original document corresponding to a certain document and may request to register the first document as the original document.

In operation 220, the image forming device may obtain first transaction information indicating that a first image forming job has been performed for the first document and a first hash code corresponding to the first transaction information. In addition, the first transaction information may include metadata related to the first document. The metadata may include data on a creator ID, a document ID, a document title, a document size, a document creation time, and the like of the first document. The first hash code may be a hash value obtained by applying the first transaction information to a certain hash function. Also, the first hash code may be a hash value obtained by applying information in the first document and the first transaction information to the certain hash function. The first hash code may be represented by a binary code.

For example, the image forming device may divide the first document into a plurality of pages. The image forming device may obtain at least one sub-hash code of at least one page, from among the plurality of pages, for which data integrity is required. The image forming device may obtain the entire hash code for the at least one sub-hash code.

In operation 230, the image forming device, based on a network of the blockchain that distributes and manages the ledger in which transaction information of the certain document has been recorded, may register the first transaction information and the first hash code in the ledger.

The image forming device may obtain a first original document corresponding to the first document from the server which manages the original document corresponding to the certain document. The image forming device may verify the validity of the first transaction information based on a result of comparing a hash code of the first original document with the first hash code of the first document.

When the first transaction information is valid, the image forming device may store a first sub-block in a preliminary block to be added to the ledger held by the image forming device. Here, the first sub-block may include the first transaction information and the first hash code. When a certain number or more of sub-blocks are stored in the preliminary block, the image forming device may perform proof-of-work of the preliminary block and may add the preliminary block to the ledger as a valid first block. Examples of the blocks and a process of performing the proof-of-work will be described with reference to FIG. 3.

The image forming device may transmit the first block to nodes in the network of the blockchain. In addition, the image forming device may provide a hash code of the first block in an account of the first user who has requested integrity of the first document. The hash code of the first block may be used to verify the integrity of the first document. Examples of verifying the integrity of a certain document in the image forming device will be described with reference to FIGS. 6 to 9.

In operation 240, the image forming device may obtain first verification information for verifying the integrity of the first document from the ledger in accordance with the first image forming job. The first verification information may include at least one of first hash codes corresponding to the first document and the hash code of the first block in which the first document is registered in the ledger. The image forming device may output the first verification information or store the first verification information in a storage or memory in the image forming device. Further, the image forming device may transmit the first verification information to an electronic device requesting the first image forming job for the first document. Further, the image forming device may obtain a job result of the first document in accordance with the first image forming job for the first document. For example, the job result may include an output of the first document, an electronic document file of the first document, and the like.

In operation 250, the image forming device may verify the integrity of the first document based on the first verification information. For example, the image forming device may receive a verification request for the integrity of the first document. The image forming device may verify the integrity of the first document using the first verification information in response to the verification request. An example of an integrity verification method for a certain document in the image forming device will be described with reference to FIGS. 6 to 9.

Figure 3:
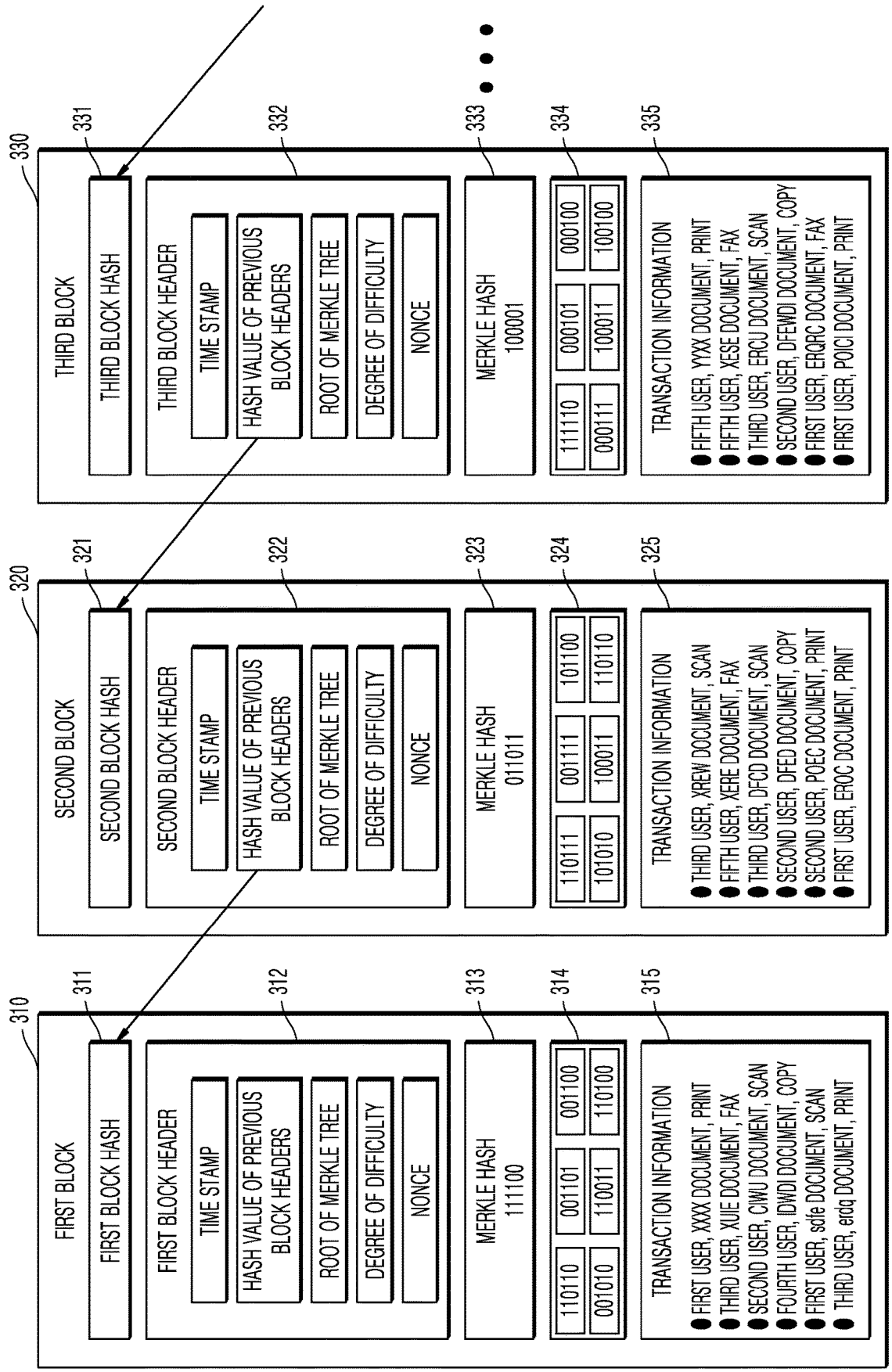
FIG. 3 is a view of a structure of blocks in which transaction information has been recorded and a blockchain in which the blocks are linked to each other, according to an example.

FIG. 3 is a view of a structure of blocks in which transaction information has been recorded and a blockchain in which the blocks are linked to each other, according to an example.

Referring to FIG. 3, the blockchain may be configured by concatenating blocks in which valid job information has been recorded. A data structure of the blockchain may be a certain data structure composed of units in which the blocks having the job information recorded therein are arranged in an order. In addition, the data structure of the blockchain may include a data structure in which block headers are linked to each other in a chain format with reference to previous block headers, respectively, and a data structure of a Merkle tree in which a hash reference pointing to data of the job information and the data of the job information are linked to each other in a tree format.

The blocks may include a block hash, a block header, a Merkle hash, a hash value, transaction information, and so on. The block header may include a time stamp, a hash value of the previous block headers, a root of the Merkle tree, a degree of difficulty, and nonce information. Referring to FIG. 3, the blockchain may be linked to a first block 310, a second block 320, and a third block 330. Each of the blocks 310, 320, and 330 may respectively include block hashes 311, 321, and 331, block headers 312, 322, and 332, Merkle hashes 313, 323, and 333, hash values 314, 324, and 334, and pieces of transaction information 315, 325, and 335.

Referring to the first block 310 to describe the elements constituting a block, the first block hash 311 may be a hash value of a hash function applied with the time stamp, the hash value of the previous block headers, the root of the Merkle tree, the degree of difficulty, and the nonce information as input values. That is, a value of the first block hash 311 may be a value obtained by hashing the first block header 312, not a value obtained by hashing the entire block.

The time stamp may refer to a time when a job started to perform the proof-of-work. A hash value of a previous block header uniquely identifies each block header and may be used to reference the previous block header. When each block header refers to the previous block header, an order of individual block headers and blocks may be maintained. In the example of FIG. 3, since the first block 310 is a first block and there is no previous block, there is no reference to a previous block header. Thus, the hash value of the previous block header of the first block 310 is zero. Since the second block 320 has the first block 310 which is the previous block, a hash value of a previous block header of the second block 320 is a first block hash 311 of a first block header 312. Since the third block 330 has the second block 320 which is the previous block, a hash value of a previous block header of the third block 330 is a second block hash 321 of a second block header 322.

The Merkle tree may refer to a structure in which the hash reference and the data of the transaction information are linked to each other in a tree format. The hash reference may refer to the data of the transaction information using a cryptographic hash value. In the first block 310, the plurality of hash values 314 may be a hash value for an individual transaction in the transaction information 315. Further, the Merkle hash 313 may be a hash value at the root when the plurality of hash values 314 are configured in a binary hash tree format. Since the cryptographic hash value is a unique value of data, different pieces of data do not have an identical hash value.

The degree of difficulty may refer to a constraint in the proof of the job or a hash puzzle. The nonce information may refer to a value that is adjusted such that the value of the block hash satisfies the constraint for the proof of the job.

Figure 4:
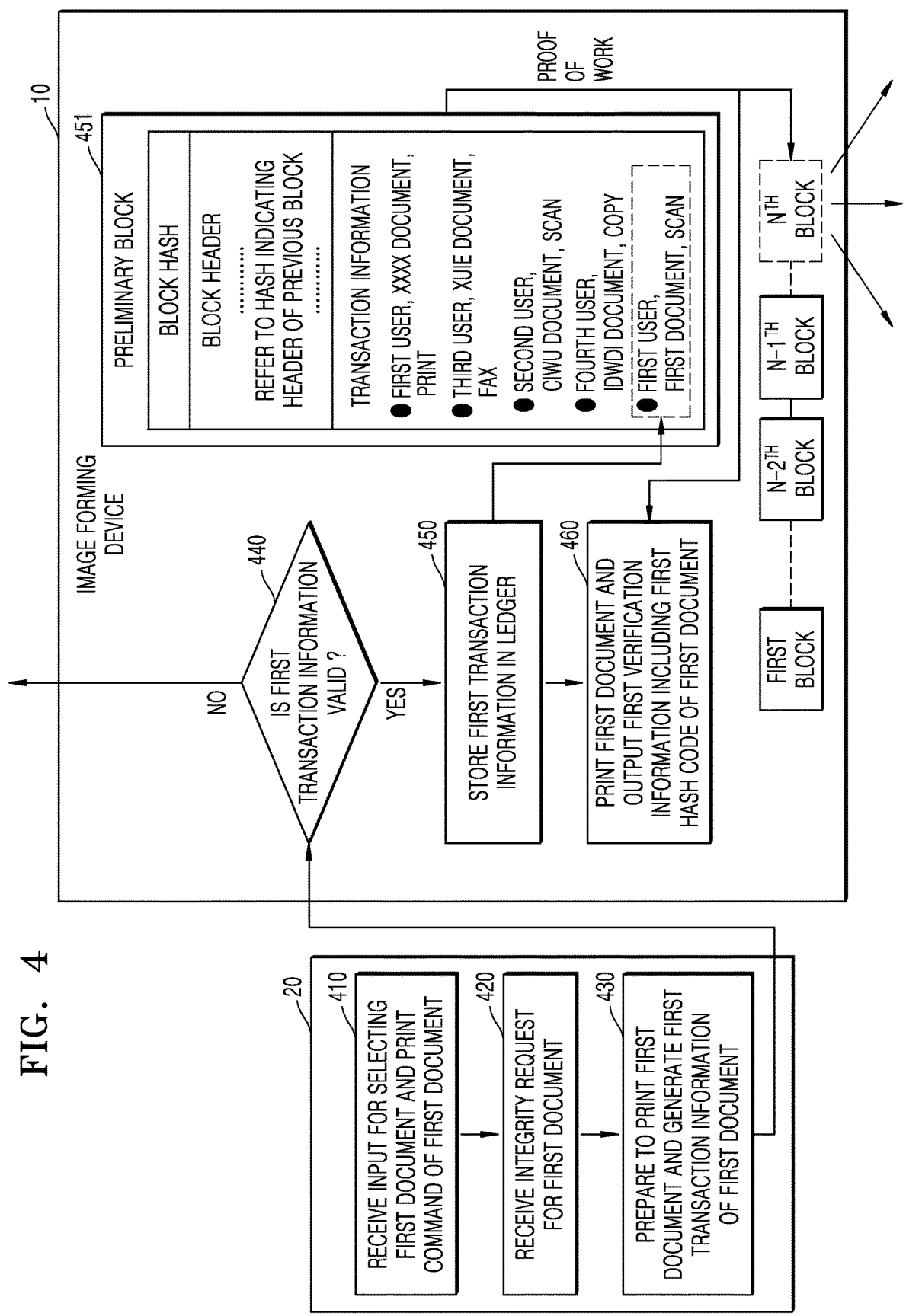
FIG. 4 is a view for describing a process of an image forming device recording transaction information of a certain document in a ledger and providing verification information used for verifying integrity of the certain document when a request for integrity of the certain document to be printed is received from an electronic device, according to an example.

FIG. 4 is a view for describing a process of an image forming device recording transaction information of a certain document in a ledger and providing verification information used for verifying integrity of the certain document when a request for integrity of the certain document to be printed is received from an electronic device, according to an example.

Referring to FIG. 4, the electronic device 20 may receive an input for selecting a first document in operation 410. As an example, the electronic device 20 may receive a print command of the first document. In operation 420, the electronic device 20 may receive an integrity request for the first document.

In operation 430, the electronic device 20 may prepare to print the first document so that the first document may be printed in the image forming device 10. For example, the electronic device 20 may render the first document to produce a first image. In addition, the electronic device 20 may generate first transaction information indicating that a print job has been performed on the first document. The electronic device 20 may apply a hash function to the first transaction information to generate a first hash code. In addition, the electronic device 20 may apply the hash function to the first transaction information and information in the first document to generate the first hash code. The electronic device 20 may encrypt the first hash code with a private key of the first electronic device 20 to generate a first cipher text. The electronic device 20 may transmit a first image on which the first document has been rendered, the first cipher text, and the first transaction information to the image forming device 10.

In operation 440, the image forming device 10 may verify validity of the first transaction information. As an example, the image forming device 10 may decrypt the first cipher text with a public key of the first electronic device 20 to obtain the first hash code.

The image forming device 10 may obtain a first original document corresponding to the first transaction information from a server that manages an original document corresponding to the certain document. The image forming device 10 may apply the hash function to the transaction information representing data of the first original document to obtain a hash code of the first original document.

The image forming device 10 may confirm whether the hash code of the first original document matches the first hash code. When the hash code of the first original document matches the first hash code, the image forming device 10 may determine that the first transaction information is valid. When it is determined that the first transaction information is invalid, the image forming device 10 may discard the first transaction information received from the electronic device 20.

In operation 450, when it is determined that the first transaction information is valid, the image forming device 10 may store the first transaction information in a ledger held by the image forming device 10. As an example, the image forming device 10 may store a first sub-block including the first transaction information in a preliminary block 451 to be added to the ledger.

For example, the first sub-block may include the first transaction information indicating job content in which a first user prints the first document, and the first hash code corresponding to the first transaction information. When a certain number or more of sub-blocks are stored in the preliminary block 451, the image forming device 10 may perform proof-of-work of the preliminary block 451 and may add the preliminary block 451 to the ledger as a valid first block. The image forming device 10 may transmit the first block to nodes in a network of a blockchain. In addition, the image forming device 10 may provide the hash code of the first block in an account of the first user who has requested integrity of the first document or transmit the hash code of the first block to the electronic device 20.

In operation 460, the image forming device 10 may print the first document based on the first image on which the first document has been rendered. Further, the image forming device 10 may output first verification information including the first hash code of the first document together with the first document. For example, the first verification information may include at least one of the first transaction information, the first hash code corresponding to the first transaction information, and the hash code of the first block on which the first transaction information has been recorded. The first verification information may be used to verify the integrity of the first document.

Figure 5:
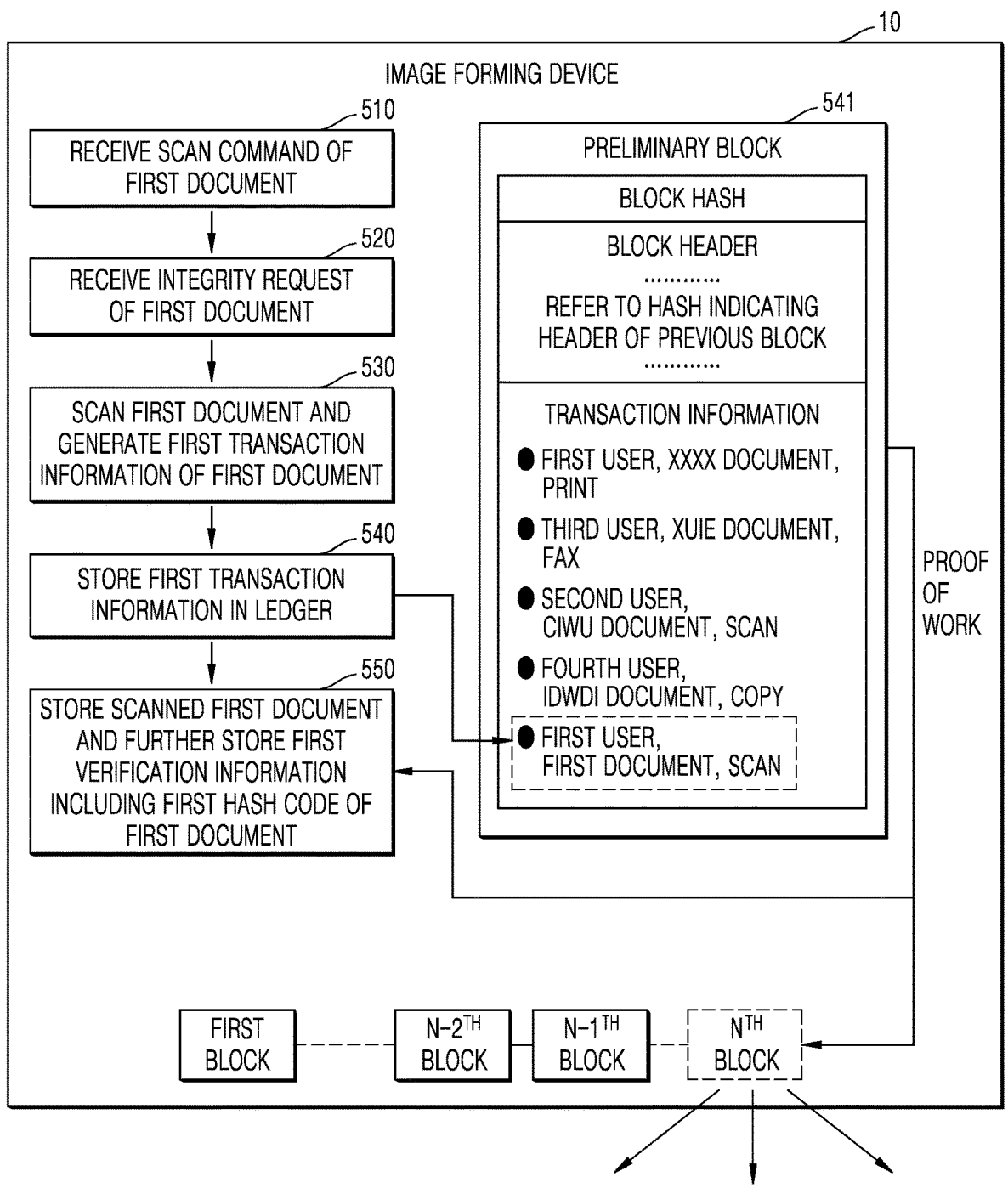
FIG. 5 is a view for describing a process of an image forming device recording transaction information of a certain document in a ledger and providing verification information used for verifying integrity of the certain document when a request for integrity of the certain document to be scanned in the image forming device is received, according to an example.

FIG. 5 is a view for describing a process of an image forming device recording transaction information of a certain document in a ledger and providing verification information used for verifying integrity of the certain document when a request for integrity of the certain document to be scanned in the image forming device is received, according to an example.

Referring to FIG. 5, the image forming device 10 may receive a scan command of the first document in operation 510. In operation 520, the image forming device 10 may receive an integrity request of the first document.

In operation 530, the image forming device 10 may scan the first document through a scanner in the image forming device 10 to obtain the first image. Further, the image forming device 10 may generate the first transaction information of the first document. The electronic device 10 may apply a hash function to the first transaction information to generate a first hash code.

In operation 540, the image forming device 10 may store the first transaction information in a ledger held by the image forming device 10. The image forming device 10 may obtain a first original document corresponding to the first transaction information from the server that manages the original document corresponding to the certain document. The image forming device 10 may apply a hash function to the transaction information representing data of the first original document to obtain a hash code of the first original document.

The image forming device 10 may confirm whether or not the hash code of the first original document matches the first hash code. When the hash code of the first original document matches the first hash code, the image forming device 10 may store a first sub-block including the first transaction information in a preliminary block 541 to be added to the ledger.

For example, the first sub-block may include the first transaction information indicating job content in which a first user scans the first document, and a first hash code corresponding to the first transaction information. When a certain number or more of sub-blocks are stored in the preliminary block 541, the image forming device 10 may perform proof-of-work of the preliminary block 541 and may add the preliminary block 541 to the ledger as a usable first block. The image forming device 10 may transmit the first block to the nodes in the network of the blockchain. In addition, the image forming device 10 may provide the hash code of the first block in an account of the first user who has requested integrity of the first document or transmit the hash code of the first block to an electronic device of the first user.

In operation 550, the image forming device 10 may store the scanned first document. Further, the image forming device 10 may store first verification information including the first hash code of the first document. For example, the first verification information may include at least one of the first transaction information, the first hash code corresponding to the first transaction information, or the hash code of the first block on which the first transaction information has been recorded.

Figure 6:
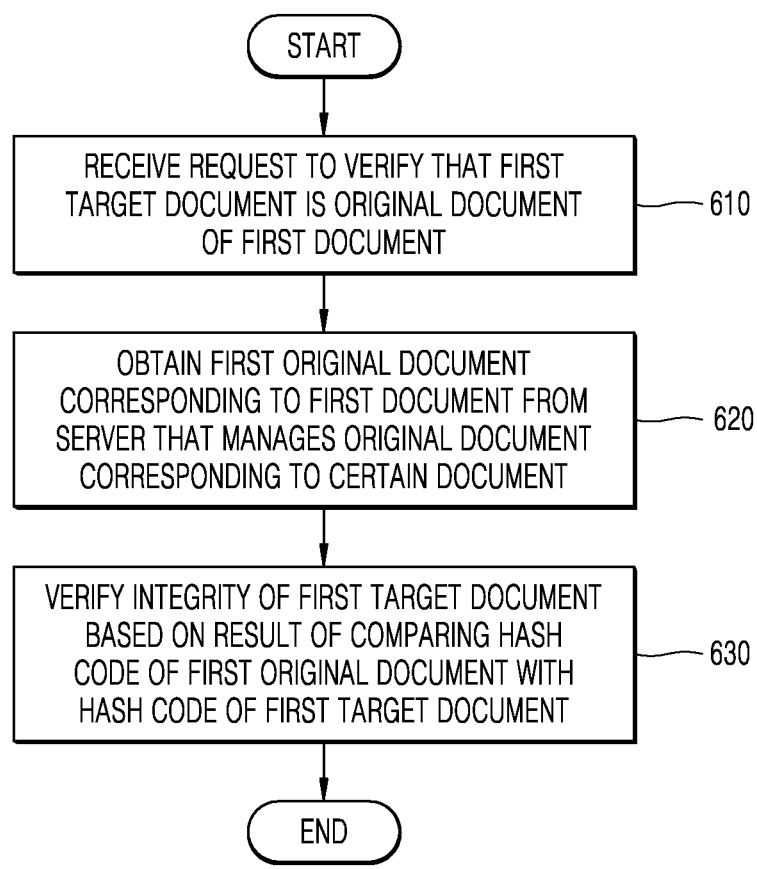
FIG. 6 is a flowchart of a method of verifying the integrity of a target document in an image forming device, according to an example.

FIG. 6 is a flowchart of a method of verifying the integrity of a target document in an image forming device, according to an example.

Referring to FIG. 6, an image forming device may receive a request to verify that a first target document is an original document of a first document in operation 610.

In operation 620, the image forming device may obtain the first original document corresponding to the first document from a server that manages an original document corresponding to a certain document.

In operation 630, the image forming device may verify integrity of the first target document based on a result of comparing a hash code of the first original document with a hash code of the first target document.

The integrity verification of the certain document of the image forming device may be provided as a notarized service to a digital electronic document. Also, an integrity verification method of the certain document of the image forming device may be used for integrity verification of a certain program in the image forming device even when reliability of the certain program is secured and the certain program is constantly updated.

Figure 7:
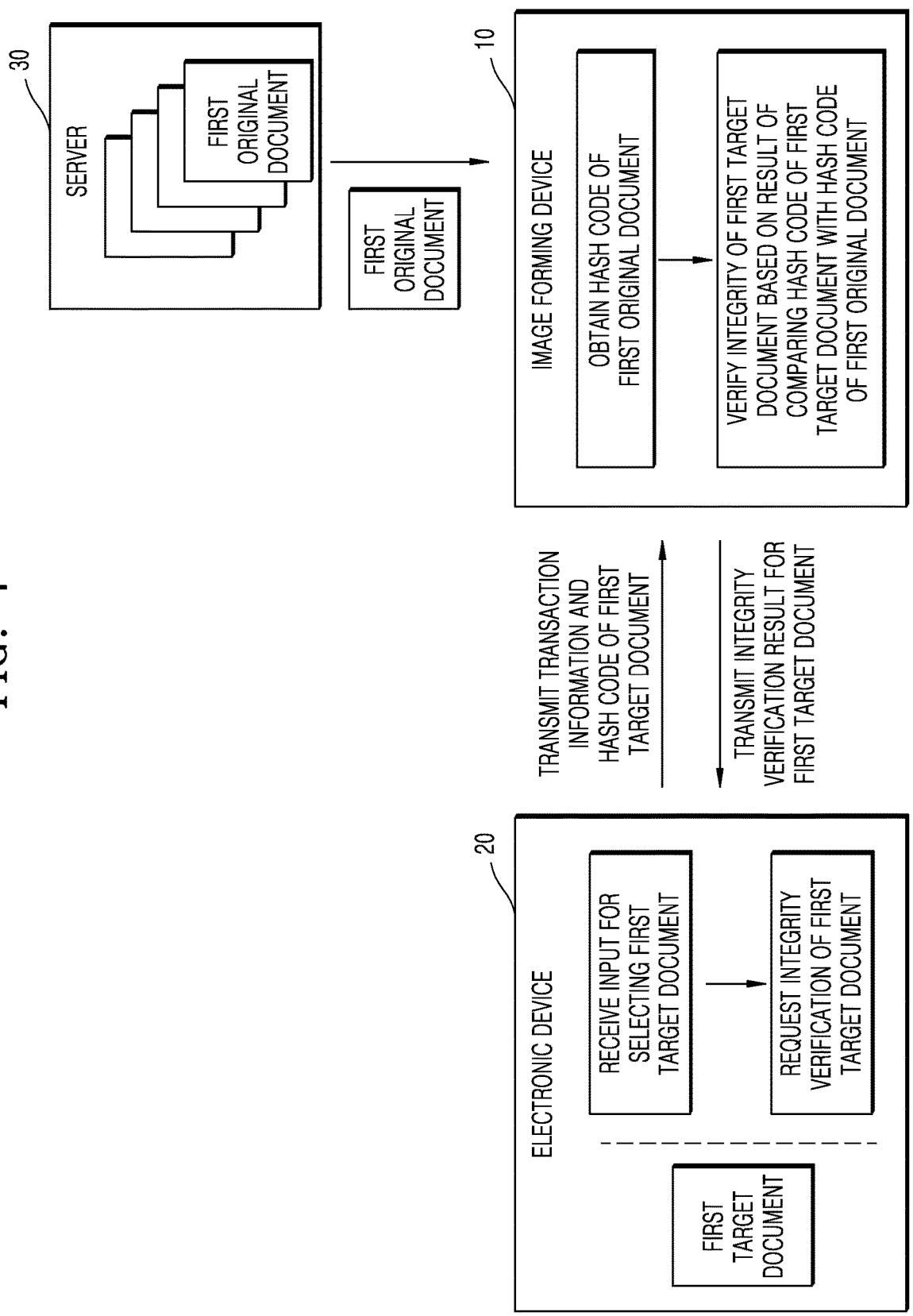
FIG. 7 is a view for describing an operation method of an image forming device when an electronic device requests the image forming device to verify the integrity of a target document, according to an example.

FIG. 7 is a view for describing an operation method of an image forming device when an electronic device requests the image forming device to verify the integrity of a target document, according to an example.

Referring to FIG. 7, the electronic device 20 may receive an input for selecting a first target document and may receive a command to request integrity verification of the first target document. For example, a first user may execute an application that performs authenticity verification of a document in the electronic device 20. The first user may input a command to request integrity verification of the first target document to confirm that there is no falsification of the first target document among documents stored in the electronic device 20.

The electronic device 20 may obtain transaction information indicating data of the first target document, and a hash code corresponding to the transaction information. The electronic device 20 may transmit the transaction information and the hash code of the first target document to the image forming device 10 to verify integrity of the first target document.

The image forming device 10 may obtain a first original document corresponding to the first target document from the server 30 that manages an original document corresponding to a certain document. For example, the image forming device 10, from the transaction information of the first target document, may request the server 30 for the first original document corresponding to the first target document. The image forming device 10 may download the first original document from the server 30.

The image forming device 10 may obtain the transaction information indicating data of the first original document. The image forming device 10 may apply the transaction information to a hash function to obtain a hash code of the first original document. The image forming device 10 may also request the hash code of the first original document to the server 30 and receive the hash code of the first original document from the server 30.

The image forming device 10 may verify the integrity of the first target document based on a result of comparing the hash code of the first target document with the hash code of the first original document. For example, when the hash code of the first target document and the hash code of the first original document are the same, the image forming device 10 may determine that the integrity of the first target document is maintained. The image forming device 10 may transmit an integrity verification result for the first target document to the electronic device 20.

Figure 8:
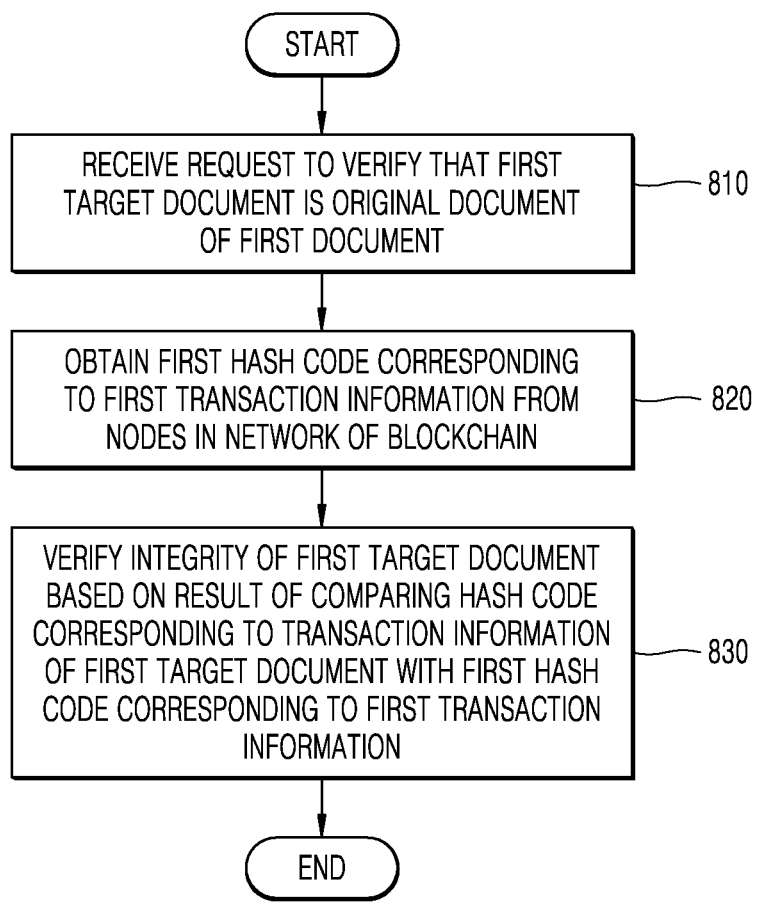
FIG. 8 is a flowchart of a method of verifying the integrity of a target document based on a blockchain in an image forming device, according to an example.

FIG. 8 is a flowchart of a method of verifying the integrity of a target document based on a blockchain in an image forming device, according to an example.

Referring to FIG. 8, an image forming device may receive a request to verify that a first target document is an original document of a first document in operation 810.

In operation 820, the image forming device may obtain a first hash code corresponding to first transaction information from nodes in a network of the blockchain.

In operation 830, the image forming device may verify integrity of the first target document based on a result of comparing a hash code corresponding to transaction information of the first target document with the first hash code corresponding to the first transaction information.

Figure 9:
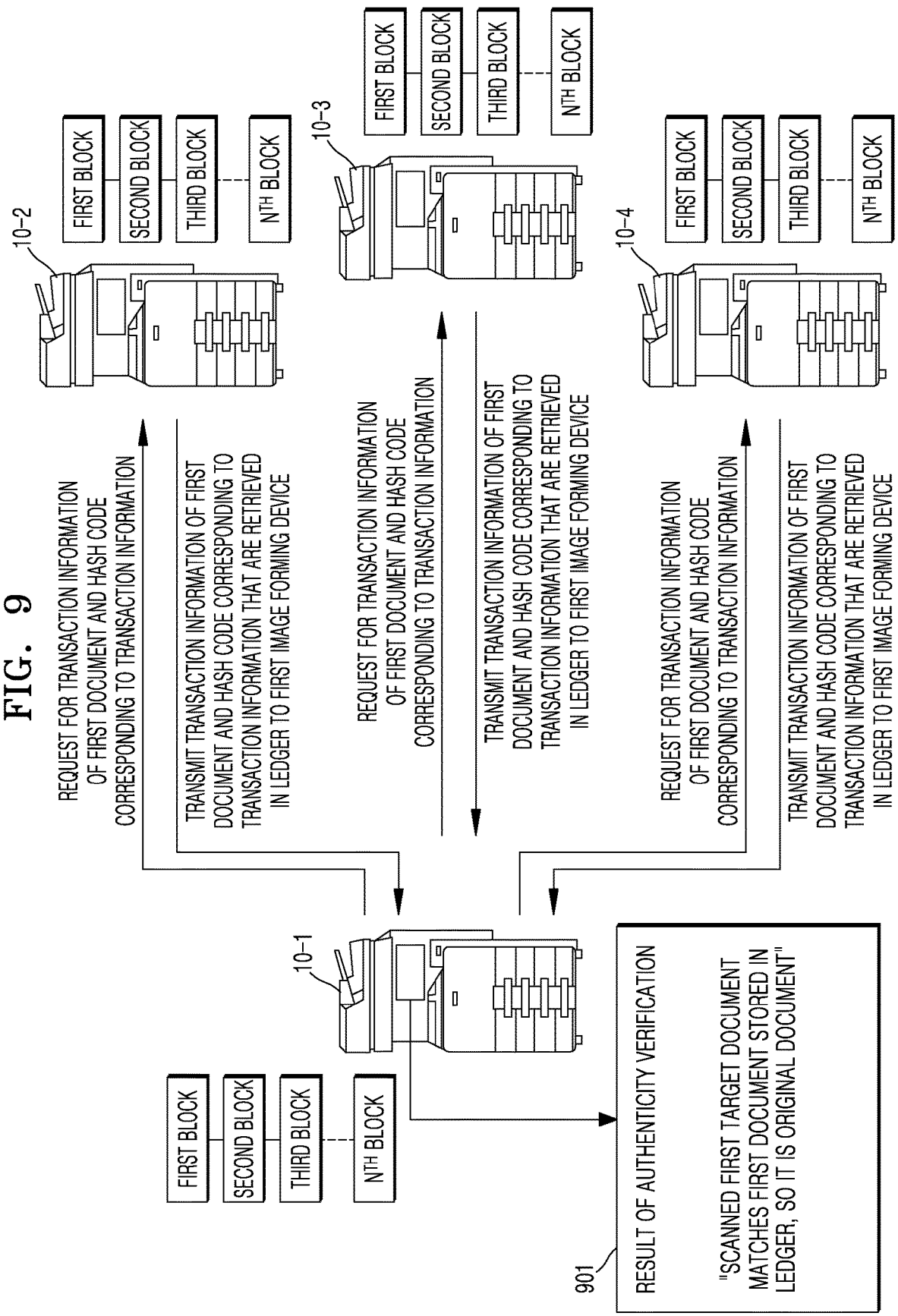
FIG. 9 is a view for describing an operation method of an image forming device when the image forming device receives an integrity verification request for a target document, according to an example.

FIG. 9 is a view for describing an operation method of an image forming device when the image forming device receives an integrity verification request for a target document, according to an example.

Referring to FIG. 9, the first image forming device 10-1 of the nodes 10-1, 10-2, 10-3, and 10-4 in a network of a blockchain may receive a request, through a user interface device of the first image forming device 10-1, to verify that a first target document is an original document of a first document. For example, the first image forming device 10-1 may display a touch button requesting to verify that a certain document is an original document through the user interface device. Further, the first image forming device 10-1 may have a physical button requesting to verify that a certain document is an original document.

A first user may scan an output on which a hash code and transaction information of the first target document are recorded through a scanner of the first image forming device 10-1. The first image forming device 10-1 may obtain a first image in which the first target document is scanned. The first image forming device 10-1 may extract the hash code and the transaction information of the first target document from the first image. The first image forming device 10-1 may request the nodes 10-2, 10-3, and 10-4 in the network of the blockchain for transaction information of a first document and a hash code corresponding to the transaction information.

Each of the nodes 10-2, 10-3, and 10-4 in the network of the blockchain may retrieve the transaction information of the first document and the hash code corresponding to the transaction information in a ledger held by each of the nodes 10-2, 10-3, and 10-4 in response to the request of the first image forming device 10-1. Each of the nodes 10-2, 10-3, and 10-4 may transmit the transaction information of the first document and the hash code corresponding to the transaction information that are retrieved in the ledger to the first image forming device 10-1.

Based on the transaction information and the hash code received from each of the nodes 10-2, 10-3, and 10-4, the first image forming device 10-1 may derive the agreement of the transaction information of the first document and the hash code. For example, among the transaction information and the hash code received from each of the nodes 10-2, 10-3, and 10-4, transaction information and a hash code exceeding a certain percentage may be determined as the transaction information of the first document and the hash code. Here, the certain percentage may be 50 percent.

The first image forming device 10-1 may verify integrity of the first target document based on a result of comparing the hash code corresponding to the transaction information of the first target document with the hash code corresponding to the transaction of the first document. For example, when the hash code of the first target document and the hash code of the first document are the same, the image forming device may determine that the integrity of the first target document is maintained. The first image forming device 10-1 may display a message 901 of "The scanned first target document matches the first document stored in the ledger, so it is the original document" through the user interface device of the first image forming device 10-1.

In an example, the first image forming device 10-1 may verify the integrity of the first target document primarily by the integrity verification method for a certain document described in FIGS. 6 and 7. When it is verified that the integrity of the first target document is maintained, the first image forming device 10-1 may verify the integrity of the first target document secondarily by the integrity verification method for a certain document described in FIGS. 8 and 9.

Figure 10:
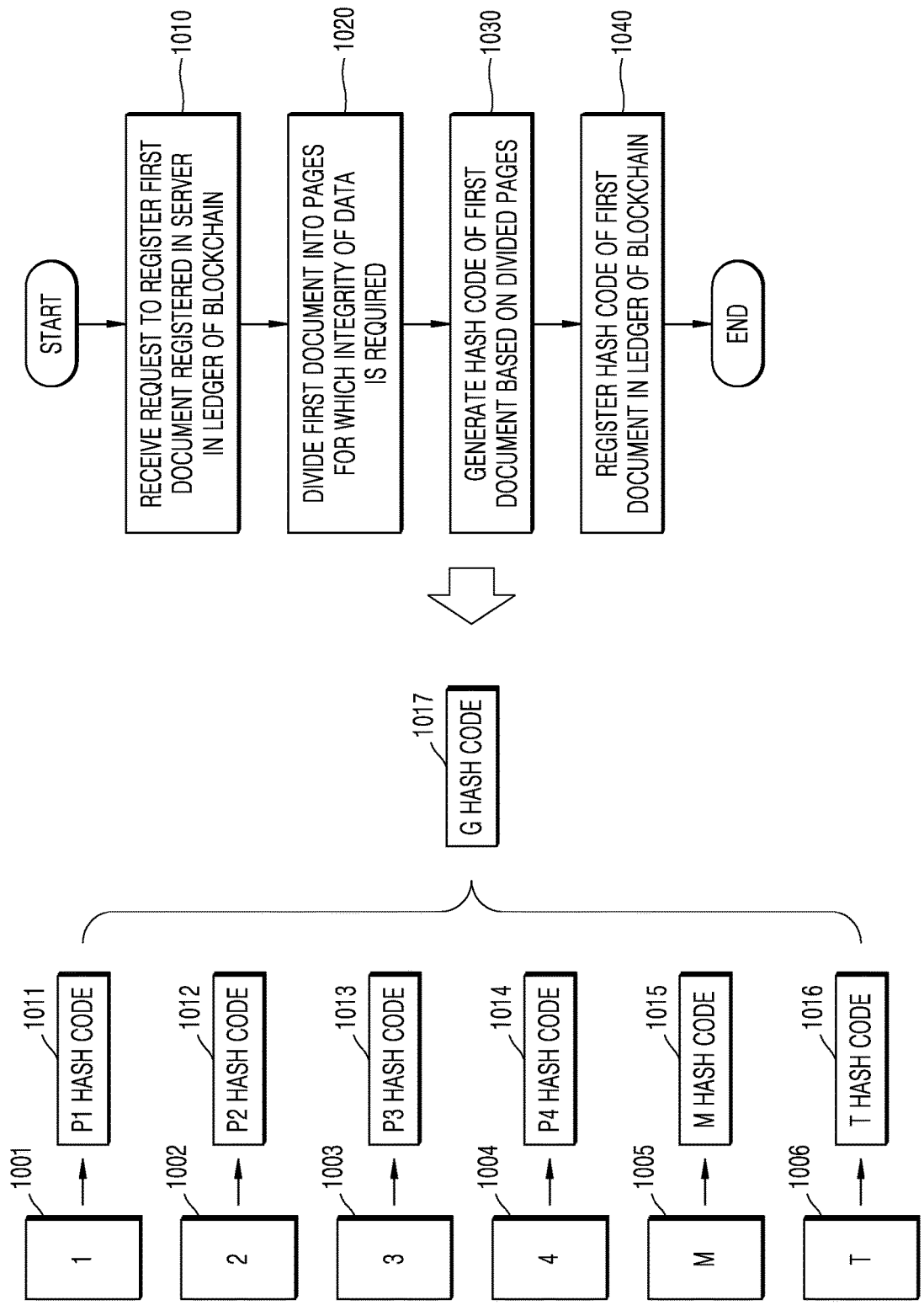
FIG. 10 is a view for describing a process of an image forming device registering a certain document in a ledger of a blockchain, according to an example.

FIG. 10 is a view for describing a process of an image forming device registering a certain document in a ledger of a blockchain, according to an example.

Referring to FIG. 10, an image forming device may receive a request to register a first document registered in a server in a ledger of a blockchain in operation 1010. In an example, the server may be a server that manages an original document corresponding to the certain document. For example, a user may connect to the server in the image forming device and select the first document among documents registered in the server. The user may input a command to register the first document in the ledger of the blockchain through a user interface device of the image forming device. As another example, the image forming device may receive a request from an external device to register the first document registered in the server in the ledger of the blockchain.

In operation 1020, the image forming device may divide the first document into pages for which the integrity of data is required. For example, the pages in the first document may be classified as a page that is allowed to be modified and a page that is not allowed to be modified. Whether the page is allowed to be modified may be preset by an administrator managing the document. The image forming device may divide the first document into page units.

In operation 1030, the image forming device may generate a hash code of the first document based on the divided pages. For example, it is assumed that the first document is a four page document. The image forming device may divide the first document into a first page 1001, a second page 1002, a third page 1003, and a fourth page 1004. The image forming device may generate a hash code by applying data of each of pages 1001, 1002, 1003, and 1004 to a hash function. That is, the image forming device may generate a P1 hash code 1011 corresponding to the first page 1001, a P2 hash code 1012 corresponding to the second page 1002, a P3 hash code 1013 corresponding to the third page 1003, and a P4 hash code 1014 corresponding to the fourth page 1004. The image forming device may also generate an M hash code 1015 corresponding to metadata 1005 of the first document and a T hash code 1016 corresponding to transaction information 1006 of the first document. The metadata 1005 of the first document may include data on a creator ID, a document ID, a document title, a document size, a document creation time, and the like of the first document. The image forming device may generate a G hash code 1017, which is the hash code of the first document, by adding the P1 hash code 1011, the P2 hash code 1012, the P3 hash code 1013, the P4 hash code 1014, the M hash code 1015, and the T hash code 1016.

In operation 1040, the image forming device may register the hash code of the first document in the ledger of the blockchain. As an example, the image forming device may generate a block in which the P1 hash code 1011, the P2 hash code 1012, the P3 hash code 1013, the P4 hash code 1014, the M hash code 1015, the T hash 1016, the metadata 1005 of the first document, the transaction information 1006 of the first document, the G hash code 1017 which is the hash code of the first document, a block hash of the previous block, and a hash of a current block are stored. The image forming device may register the generated block in the ledger of the blockchain.

The image forming device may obtain authority information for the certain document and register the authority information in the ledger of the blockchain. For example, the authority information may include at least one of a document ID, a group to which the document is authorized, a user ID to which the document is authorized, an ID of the image forming device, an IP address, and a policy. For example, the authority information may include information about which page in the certain document modification authority is located, information about which user has modification authority in the certain document, information about whether print, copy, scan, or fax jobs for the certain document are allowed, and the like.

Figure 11:
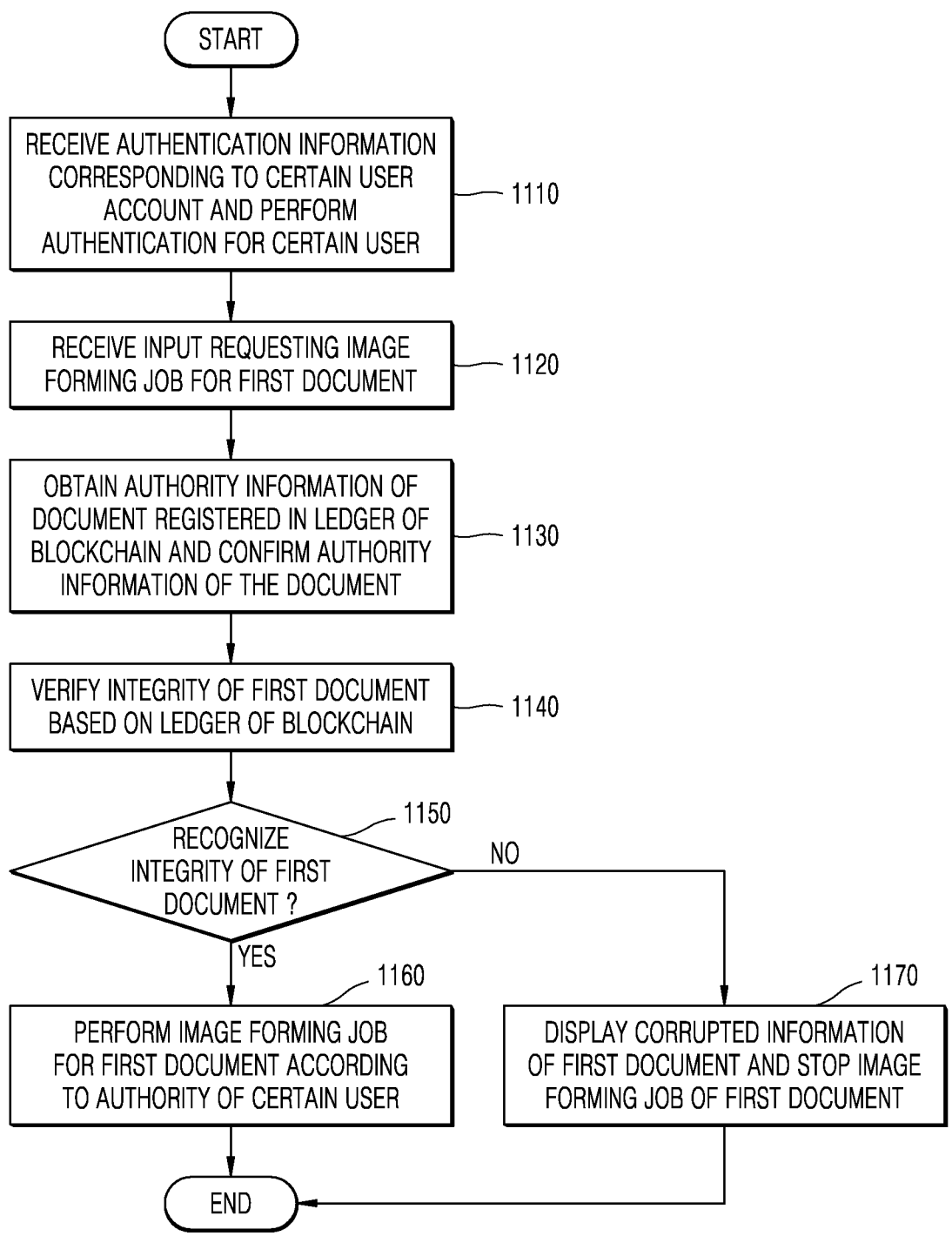
FIG. 11 is a view for describing a process of an image forming device controlling an image forming job based on a result of integrity verification of a certain document, according to an example.

FIG. 11 is a view for describing a process of an image forming device controlling an image forming job based on a result of integrity verification of a certain document, according to an example.

Referring to FIG. 11, an image forming device may receive authentication information corresponding to a certain user account and perform authentication for a certain user in operation 1110. Here, the authentication information may be information that can identify a user when the user uses the image forming device. For example, the authentication information may include a user's ID, a user's name, a password, an e-mail address, a telephone number, an address, an authority ID mapped to the user's ID, a certificate, and the like. The authentication information may also include information that can identify a user such as a user's fingerprint, voice, iris, and the like.

In operation 1120, the image forming device may receive an input requesting an image forming job for the first document. Here, the image forming job may be one of a print job, a copy job, a scan job, and a fax job for the first document.

In operation 1130, the image forming device may obtain authority information of a document registered in a ledger of a blockchain and confirm the authority information of the document. For example, the authority information of the document may be information about whether or not a certain page in the document can be modified, information about the kind of job that can be performed on the document, and the like.

In operation 1140, the image forming device may verify integrity of the first document based on the ledger of the blockchain.

In operation 1150, when the integrity of the first document is recognized, the image forming device may perform an operation according to operation 1160. When the integrity of the first document is not recognized, the image forming device may perform an operation according to operation 1170.

In operation 1160, the image forming device may perform the image forming job for the first document according to authority of the certain user.

In operation 1170, the image forming device may obtain corruption information of the first document. For example, the corruption information may include information of a corrupted page in the first document. The image forming device may display the corrupted information of the first document and stop the image forming job of the first document. As an example, the image forming device may stop an image forming job for the corrupted page and may determine an uncorrupted page as a page that has been verified as having integrity. The image forming device may perform an image forming job for the page that has been verified as having integrity. That is, the image forming device may perform the image forming job for the page that has been verified as having integrity in the first document.

Further, the image forming device may transmit corruption information of the first document to an administrator's device.

Figure 12:
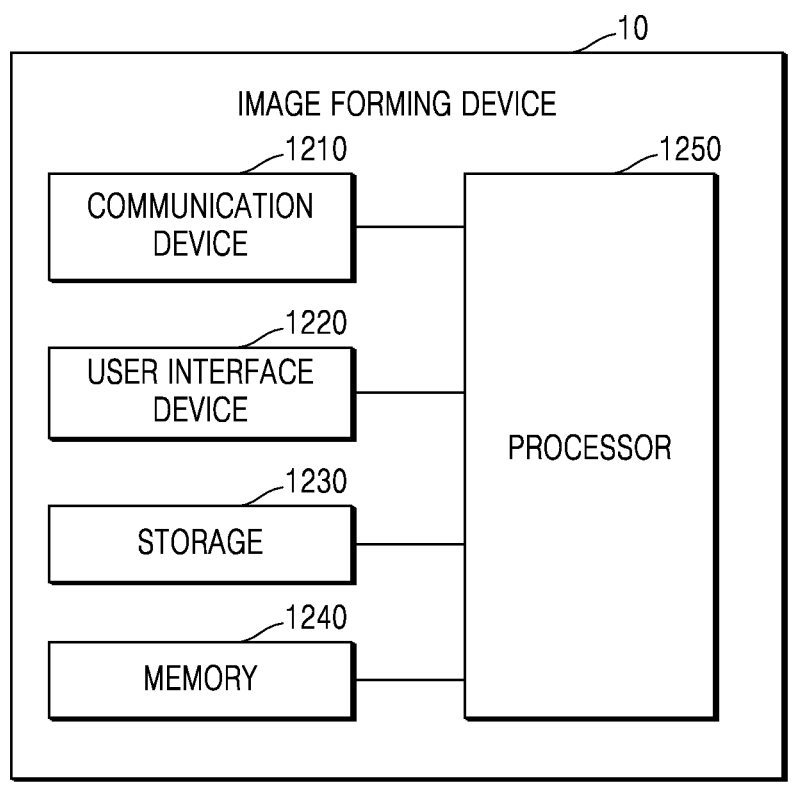
FIG. 12 is a block diagram of a configuration of an image forming device, according to an example.

FIG. 12 is a block diagram of a configuration of an image forming device, according to an example.

Referring to FIG. 12, the image forming device 10 may include a communication device 1210, a user interface device 1220, a storage 1230, a memory 1240, and a processor 1250. The image forming device 10 may be embodied with more or fewer elements than the elements shown in the drawings. Hereinafter, examples of the elements will be described.

The communication device 1210 may communicate with an external device. As an example, the communication device 1210 may be connected to a network in a wired or wireless manner and may communicate with the external device. The external device may be a node that distributes and manages a ledger based on a blockchain.

The communication device 1210 may include a communication module (e.g., transceiver) that supports one of a variety of wired or wireless communication methods. For example, the communication module may be in the form of a chipset or may be a sticker/barcode (e.g., a sticker including a near field communication (NFC) tag) or the like that includes information necessary for communication. The communication module may be a short-range communication module or a wired communication module.

The communication device 1210 may support, for example, a wireless local area network (LAN), wireless fidelity (Wi-Fi), Wi-Fi Direct, Bluetooth, a universal serial bus (USB), a Wired LAN, NFC, and the like.

The user interface device 1220 may include an input unit for receiving, from a user, an input for performing an image forming job, and an output unit for displaying information, such as a result of performing the image forming job or a status of the image forming device 10. For example, the user interface device 1220 may include an operation panel for receiving a user input, a display panel for displaying a screen, and the like.

As an example, the input unit may include a device for receiving various types of user inputs, such as a keyboard, a physical button, a touch screen, a camera, a microphone, and the like. Also, the output unit may include, for example, a display panel, a speaker, and the like. However, examples are not limited thereto, and the user interface device 1220 may include a device supporting various inputs and outputs.

The storage 1230 may store information about a certain document recorded in the ledger of the blockchain. For example, the storage 1230 may store metadata related to a creator ID, a document ID, a document title, a document size, a document creation time, and the like of the certain document. The storage 1230 may also store an original document for the certain document downloaded from a server. Further, the storage 1230 may store account information of a plurality of users using the image forming device 10. Also, the storage 1230 may store authority information for the certain document.

The memory 1240 may store programs, data or files related to the image forming device 10. For example, the processor 1250 may execute a program stored in the memory 1240, read data or a file stored in the memory 1240, or store a new file in the memory 1240. The memory 1240 may store program commands, data files, data structures or a combination thereof. The memory 1240 may store instructions executable by the processor 1250.

The processor 1250 controls overall operations of the image forming device 10, and may include at least one processor, such as a central processing unit (CPU). Also, the processor 1250 may control other components included in the image forming device 10 such that an operation corresponding to a user input received through the user interface device 1220. Furthermore, the processor 1250 may include at least one specialized processor corresponding to each function, or may be a single integrated processor.

The image forming device 10 may obtain a request for performing a preparation operation for verifying integrity of a first document according to a first image forming job for the first document. For example, the image forming device 10 may receive the request for performing the preparation operation for verifying the integrity of the first document through an external button or the user interface device 1220 in the image forming device 10. As an example, in response to the request for performing the preparation operation, the processor 1250 may scan the first document through a scanner (not shown) in the image forming device 10 and perform the preparation operation to be performed before the integrity verification of the scanned first document. For example, the preparation operation may be an operation for registering the first document in the ledger of the blockchain.

The processor 1250 may obtain first transaction information of the first document and a first hash code corresponding to the first transaction information. For example, the first transaction information may be information indicating that the first image forming job has been performed on the first document. The first hash code may be a hash value obtained by applying the first transaction information to a certain hash function.

The processor 1250 may divide the first document into a plurality of pages. The processor 1250 may obtain at least one sub-hash code of at least one page, from among the plurality of pages, for which data integrity is required. The processor 1250 may obtain the entire hash code for the at least one sub-hash code.

The processor 1250, based on a network of the blockchain that distributes and manages a ledger in which transaction information of the certain document has been recorded, may register the first transaction information and the first hash code in the ledger.

The processor 1250 may obtain a first original document corresponding to the first document from the server that manages the original document corresponding to the certain document. The processor 1250 may verify the validity of the first transaction information based on a result of comparing a hash code of the first original document with a first hash code of the first document.

When the first transaction information is valid, the processor 1250 may store a first sub-block in a preliminary block to be added to the ledger held by the image forming device 10. Here, the first sub-block may include the first transaction information and the first hash code. When a certain number or more of sub-blocks are stored in the preliminary block, the processor 1250 may perform proof-of-work of the preliminary block and may add the preliminary block to the ledger as a valid first block.

The processor 1250 may transmit the first block to a plurality of nodes in the network of the blockchain through the communication device 1210. In addition, the processor 1250 may provide a hash code of the first block in an account of the first user who has requested integrity of the first document. The hash code of the first block may be used to verify the integrity of the first document.

The processor 1250 may obtain first verification information for verifying the integrity of the first document according to the first image forming job. The first verification information may include at least one of a first hash code corresponding to the first document and the hash code of the first block in which the first document is registered in the ledger. The processor 1250 may control the configuration in the image forming device 10 such that the first verification information is output or may control the first verification information to be stored in the storage 1230 or the memory 1240 in the image forming device 10. Further, the processor 1250 may transmit the first verification information to an electronic device requesting the first image forming job for the first document through the communication device 1210. Further, the processor 1250 may obtain a job result of the first document in accordance with the first image forming job for the first document. For example, the job result may be output of the first document, an electronic document file of the first document, and the like.

The processor 1250 may verify the integrity of the first document based on the first verification information. For example, the processor 1250 may receive a verification request for the integrity of the first document. The processor 1250 may verify the integrity of the first document using the first verification information in response to the verification request.

For example, the processor 1250 may obtain a request to verify that a first target document is an original document of the first document. The processor 1250 may obtain a first original document corresponding to the first document from the server that manages the original document corresponding to the certain document. The processor 1250 may verify the integrity of the first target document based on a result of comparing a hash code of the first target document with the hash code of the first original document.

The processor 1250 may also obtain a first hash code corresponding to the first transaction information from nodes in the network of the blockchain. The processor 1250 may verify the integrity of the first target document based on a result of comparing a hash code corresponding to transaction information of the first target document with the first hash code corresponding to the first transaction information.

The processor 1250 may receive authentication information corresponding to a certain user account through the user interface device 1220 and perform authentication for the certain user. Here, the authentication information may be information that can identify a user when the user uses the image forming device 10.

The processor 1250 may receive an input requesting an image forming job for the first document through the user interface device 1220.

The processor 1250 may obtain authority information of a document registered in the ledger of the blockchain and confirm the authority information of the document. For example, the authority information of the document may be information about whether or not a certain page in the document can be modified, information about the kind of job that can be performed on the document, and the like.

The processor 1250 may verify the integrity of the first document based on the ledger of the blockchain.

When the integrity of the first document is recognized, the processor 1250 may perform an image forming job of the first document according to an authority of the certain user.

When the integrity of the first document is not recognized, the processor 1250 may obtain corruption information of the first document. For example, the corruption information may include information of a corrupted page in the first document. The processor 1250 may display the corruption information of the first document through the user interface device 1220. The processor 1250 may control the configuration in the image forming device 10 so that the image forming job of the first document is stopped.

As an example, the processor 1250 may control the configuration in the image forming device 10 so that the image forming job of the first document is stopped. The processor 1250 may determine an uncorrupted page as a page that has been verified as having integrity. The processor 1250 may control the configuration in the image forming device 10 so that the image forming job for the page that has been verified as having integrity is performed. That is, the image forming device 10 may perform the image forming job for the page that has been verified as having integrity in the first document.

Operation methods as described above may be implemented in the form of a non-transitory computer-readable recording medium storing instructions or data executable by a computer or a processor. The examples may be written as computer programs and may be implemented in general-use digital computers that execute programs using the computer-readable recording medium. The computer-readable recording medium may include read only memory (ROM), random access memory (RAM), flash memory, CD-ROMs, CD-Rs, CD+Rs, CD-DVD-Rs, DVD-Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, or solid-state disks (SSD), and may be any device capable of storing instructions or software, associated data, data files, and data structures, and providing the instructions or software, associated data, data files, and data structures to a processor or a computer such that the processor or computer may execute the instructions.

Although the examples have been described with reference to the accompanying drawings, those of ordinary skill in the art will understand that various changes and modifications may be made therein. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, the scope of the present disclosure should be defined not by the described examples alone, but by the appended claims and the equivalents thereof.

What is claimed is:

1. An operation method of an image forming device, the method comprising:
receiving a request for performing a preparation operation for verifying integrity of a first document according to a first image forming job for the first document;
obtaining first transaction information indicating that the first image forming job has been performed for the first document and obtaining a first hash code corresponding to the first transaction information by dividing the first document into a plurality of pages and obtaining at least one sub-hash code of at least one page, from among the plurality of pages, for which data integrity is required and obtaining an entire hash code for the at least one sub-hash code;
registering the first transaction information and the first hash code in a ledger based on a network of a blockchain that distributes and manages the ledger in which transaction information of a certain document has been recorded;
obtaining first verification information for verifying the integrity of the first document from the ledger according to the first image forming job; and
verifying the integrity of the first document based on the first verification information.

2. The operation method of claim 1, wherein the registering of the first transaction information and the first hash code in the ledger comprises:
storing a first sub-block comprising the first transaction information and the first hash code in a preliminary block to be added to the ledger held by the image forming device when the first transaction information is valid; and
performing proof-of-work of the preliminary block and adding the preliminary block to the ledger as a valid first block when a certain number or more of sub-blocks are stored in the preliminary block.

3. The operation method of claim 2, wherein the registering of the first transaction information and the first hash code in the ledger comprises:
obtaining a first original document corresponding to the first document from a server that manages an original document corresponding to the certain document; and
verifying validity of the first transaction information by comparing a hash code of the first original document with the first hash code.

4. The operation method of claim 2, wherein the registering of the first transaction information and the first hash code in the ledger comprises:
transmitting the first block to a plurality of nodes in the network of the blockchain; and providing a hash code of the first block in an account of a first user who has requested integrity of the first document.

5. The operation method of claim 1, wherein the verifying of the integrity of the first document comprises:
verifying integrity of a first target document based on a hash code of the first target document when receiving a request to verify that the first target document obtained from the image forming device or an external device is an original document of a first document.

6. The operation method of claim 5, wherein the verifying of the integrity of the first target document comprises:
receiving a request to verify that the first target document is the original document of the first document;
obtaining a first original document corresponding to the first document from a server that manages an original document corresponding to the certain document; and
verifying the integrity of first target information by comparing a hash code of the first original document with the hash code of the first target document.

7. The operation method of claim 5, wherein the verifying of the integrity of the first target document comprises:
receiving a request to verify that the first target document is the original document of the first document;
obtaining the first hash code corresponding to the first transaction information from nodes in the network of the blockchain; and
verifying the integrity of the first target document by comparing a hash code corresponding to the transaction information of the first target document with the first hash code corresponding to the first transaction information.

8. The operation method of claim 1, further comprising:
verifying integrity for each of the plurality of pages based on the blockchain;
confirming authority of a first user based on an account of the first user who has requested the first image forming job, when the integrity of the first document is recognized; and
controlling the first image forming job according to the authority of the first user.

9. The operation method of claim 1, further comprising:
verifying integrity for each of the plurality of pages based on the blockchain; and
displaying information of a certain page whose integrity has been corrupted among the plurality of pages and stopping the first image forming job for the certain page when the integrity of the first document is verified to be corrupted.

10. A non-transitory computer readable medium having stored thereon a program for operating an image forming device, the non-transitory computer readable medium comprising:
instructions to receive a request for performing a preparation operation for verifying integrity of a first document according to a first image forming job for the first document;
instructions to obtain first transaction information indicating that the first image forming job has been performed for the first document and obtain a first hash code corresponding to the first transaction information;
instructions to register the first transaction information and the first hash code in a ledger based on a network of a blockchain that distributes and manage a ledger in which transaction information of a certain document has been recorded;
instructions to obtain first verification information for verifying the integrity of the first document from the ledger according to the first image forming job; and
instructions to verify the integrity of the first document based on the first verification information,
wherein the instructions to register the first transaction information and the first hash code in the ledger comprise:
instructions to obtain a first original document corresponding to the first document from a server that manages an original document corresponding to the certain document; and
instructions to verify validity of the first transaction information by comparing a hash code of the first original document with the first hash code.

11. An image forming device comprising:
a communication device;
a user interface device;
a storage;
a processor; and
a memory to store instructions executable by the processor,
wherein the processor is to execute the instructions to:
receive a request for performing a preparation operation for verifying integrity of a first document according to a first image forming job for the first document;
obtain first transaction information indicating that the first image forming job has been performed for the first document and obtain a first hash code corresponding to the first transaction information;
register the first transaction information and the first hash code in a ledger based on a network of a blockchain that distributes and manages the ledger in which transaction information of a certain document has been recorded;
obtain first verification information for verifying the integrity of the first document from the ledger according to the first image forming job;
verify the integrity of the first document based on the first verification information;
receive a request to verify that a first target document is an original document of the first document;
obtain a first original document corresponding to the first document from a server that manages an original document corresponding to the certain document; and
verify the integrity of first target information by comparing a hash code of the first original document with a hash code of the first target document.

12. The image forming device of claim 11, wherein the processor executes the instructions to:
store a first sub-block comprising the first transaction information and the first hash code in a preliminary block to be added to the ledger held by the image forming device when the first transaction information is valid; and
perform proof-of-work of the preliminary block and add the preliminary block to the ledger as a valid first block when a certain number or more of sub-blocks are stored in the preliminary block.

13. The image forming device of claim 11, wherein the processor executes the instructions to:
receive a request to verify that a first target document is an original document of the first document;

obtain the first hash code corresponding to the first transaction information from nodes in the network of the blockchain; and verify the integrity of first target information by comparing a hash code corresponding to the transaction information of the first target document with the first hash code corresponding to the first transaction information.

\* \* \* \* \*